July 31, 1962 M. D. COMPTON 3,047,418
METHOD OF PRODUCING NOVEL DECORATIVE EFFECTS ON CERAMIC OBJECTS
Filed Oct. 23, 1959
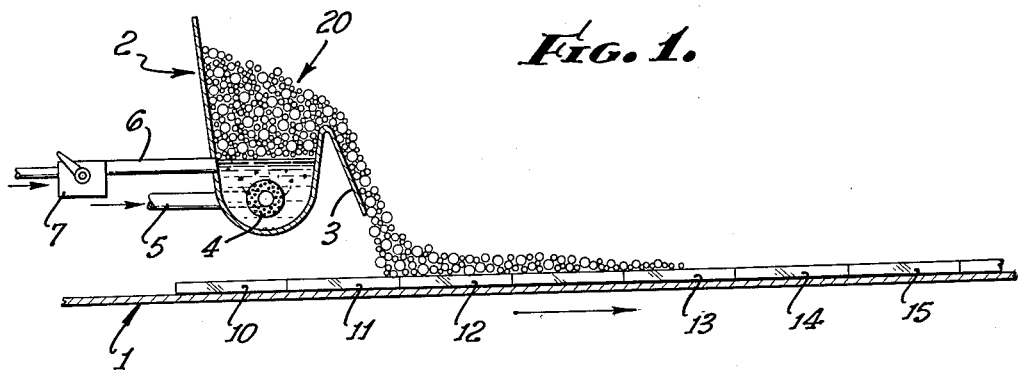
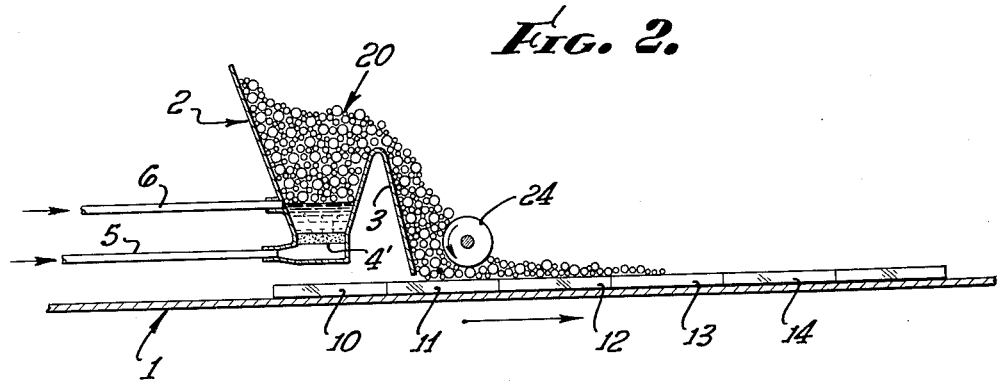
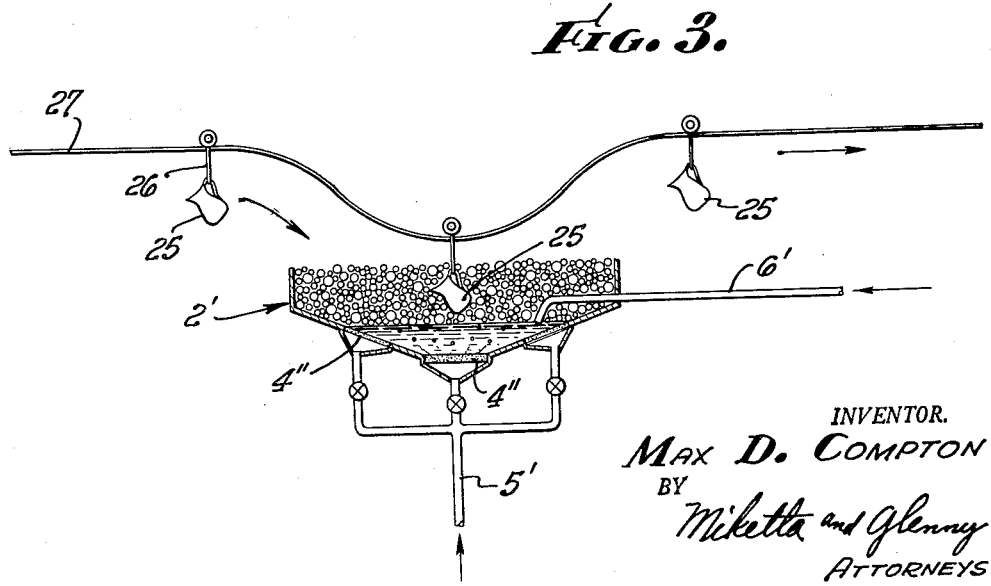
INVENTOR.
MAX D. COMPTON
BY
Miketta and Glenny
ATTORNEYS.

United States Patent Office 3,047,418
Patented July 31, 1962

3,047,418
METHOD OF PRODUCING NOVEL DECORATIVE EFFECTS ON CERAMIC OBJECTS
Max D. Compton, Glendale, Calif., assignor to Gladding, McBean & Co., Los Angeles, Calif., a corporation of California
Filed Oct. 23, 1959, Ser. No. 848,322
8 Claims. (Cl. 117—37)

This invention pertains to a novel method of producing a distinctive and characteristic, variegated, decorative pattern of pigmentation or coloring on the surface of ceramic objects, and to compositions and devices adapted for use in the practice of such method.

Ceramic objects such as tile, artware and the like, whether made by pressing, molding, jiggering, or casting, generally have their surfaces (or portions thereof) provided with a suitable decoration. Such decoration may involve the use of decalcomanias, colored glazes, hand-painting, or other methods of applying a pattern or decoration of desired coloration to the surface of the body. Usually such patterns or decorations are applied either to the bisque or to a pre-glazed object and then the decoration is covered by a secondary glaze. Substantially all of these methods involve the production of decoration having a formalized appearance. The present invention is not only directed to a method which eliminates the use of decalcomania, hand-painting, silk screen methods, and others previously employed, but also produces a totally different, variegated, decorative pattern which is distinctively novel in appearance. Moreover, the method of the present invention is applicable to planar surfaces such as the surfaces of tile and to curved surfaces such as are found on cups, bowls, pitchers and other objects.

Generally stated, the method comprises forming a suspension of pigment or dye in a liquid medium containing a foam-producing agent and converting such suspension into a foam or mass of bubbles. Such bubble-containing foam is then deposited upon the surfaces of formed ceramic articles and permitted to subside. The color-imparting or color-generating material is thus deposited upon the surfaces in a pattern which is influenced by the size and stability of the bubbles of the foam and the number of bubbles or thickness of foam used. The pigment or dye thus deposited is then matured by firing the object either before or after the application of a glaze composition thereto.

An object of the present invention, therefore, is to disclose and provide a method of producing novel, distinctively variegated, decorative patterns of pigmentation to the surface of a ceramic object.

Another object of the invention is to provide a method of utilizing foams containing gas-filled bubbles in the application of pigments, dyes and other color-generating materials to the surfaces of formed ceramic objects.

An object of the invention also is to disclose and provide novel compositions containing color-generating materials and arrangements and devices whereby color-generating materials may be applied to the surfaces of ceramic objects.

These and various other objects, uses, adaptations and modifications of the invention will become apparent to those skilled in the art from the following description. In order to facilitate understanding, reference will be had to the appended drawings, in which:

FIG. 1 is a somewhat diagrammatic representation of an arrangement of elements which may be employed in generating the desired foam and applying it to the surfaces of tile.

FIG. 2 is a representation of a modified arrangement.

FIG. 3 diagrammatically illustrates an arrangement for applying the method of this invention to objects having curved surfaces.

The term "color-generating material" as used herein relates to any pigment, dye or other material capable of generating a desired color on the ceramic objects being decorated. The term "color-generating material" refers to metallic oxides, stains, frits and non-fugitive, heat-resistant compounds which may have inherent coloration or combine with glaze composition constituents to produce a desired color after firing under suitable atmospheric conditions The term "formed ceramic object" as used herein refers to any ceramic object irrespective of its method of formation, i.e. it can be formed by dry-pressing, wet-pressing, molding, jiggering, casting, etc. The method of the invention is independent of the composition used in the formed ceramic object; the objects may consist essentially of clay-like materials, may be made of unusual stoneware compositions, porcelanic compositions, mixtures of clays, feldspars and the like, or may be composed of compositions high in magnesia, talc, wollastonite, etc. with appreciable quantities of matrix-forming material, such as ground glass, materials, high in alkalies, grog, etc. The formed ceramic objects, prior to the application of the pigmenting foam, may be in a burned or an unburned condition; although usually such formed objects are finely porous (having an absorption of between about 5% and 18%), such porosity is not essential and the method of the invention may be applied to burned and glazed objects, such glazed surfaces being substantially non-absorbent.

The gas-filled bubble-containing foam utilized in carrying out the method of this invention comprises an aqueous liquid containing the desired color-generating material and a foaming agent. The foaming agent may consist of a soap, sodium palmatate, saponin, or any desired wetting agent or detergent either of the anionic, cationic or non-ionic types. Water-soluble soaps, including the naphthenic soaps, are well adapted for use in preparing the foams.

In addition, stabilizing agents are often employed for the purpose of controlling the size and stability of the foam produced. Such stabilizing agents also exert a suspending effect upon the very finely divided pigment, dye or other color-generating material; various vegetable gums, such as gum arabic, gum tragacanth, pectin and substances such as methoxy cellulose may be used. All of the bubbles of the foam are gas-filled and although air is customarily employed, other gases or mixtures of gases such as carbon dioxide or even nitrogen may be employed.

In all instances, the color-generating material should be in a state of very fine division and consist essentially of material passing a 300-mesh sieve. Ball milled frits, stains, pigmenting oxides and the like (which may be ball milled with a small amount of wetting agent) and having an average particle size on the order of 5 microns have been successfuly employed.

In producing the suspensions and dispersions from which the foams are generated, it has been found desirable to wet-grind the pigments, frits and dyes (either alone or in the presence of small amounts of clay, and stabilizing agent) and then mix the resulting stain slurry with an aqueous solution of foaming agent. Such procedure insures the reduction of solid frits, dyes, etc., to an extremely fine state of division, insures thorough wetting of these fine particles and permits variation of bubble size by controlled variation in the ratio of foaming agent to pigmenting solids or color imparting agents.

The color imparting or stain slurries may contain from about 5% to as high as 50% of frit, coloring oxides, ceramic stains, dyes or pigments, depending upon the color-generating properties; they may contain opacifiers, fat clay, bentonite, various carbonates, fluxes and stabilizing agents in smaller proportions, these adjuvants rarely exceeding 20% by weight of such stain slurry. For example, the stain slurry may contain 0.05% to 1.5% by weight of stabilizing agents such as carboxy methyl cellulose, glue, a dispersible or soluble alginate, or a hydrophilic vegetable gum such as gum tragacanth, karaya or the like; it may contain 0.5% to about 4% of bentonite; it may contain 1.0% to 10% of flux such as lead bisilicate or ceramic substances such as calcium, barium or manganese carbonate, opacifiers such as titanium dioxide, zirconium oxide, etc.

The aqueous solution of foaming agent may contain from 0.5% to 3% of a suitable surfactant or foaming agent and may also contain a foam stabilizing agent such as glycerin, boiled starch, aqueous dispersions of vinyl and methacrylic polymers and copolymers, etc. Solutions of boiled starch are very effective in controlling size of bubbles; such boiled starch solutions (containing 5% to 10% of starch) may be added to the solution containing the detergent or surfactant to impart a starch content of 1% to 5% thereto.

Exemplary staining slurries which have been made by ball milling the ingredients for 12 to 24 hours include the following (compositions in percent by weight):

|  | A | B | C |
|---|---|---|---|
| Coloring frit | 8.9 | 40.0 | 20.0 |
| Coloring stain | 31.0 | | |
| English fat clay | | 3.5 | |
| Bentonite | 0.8 | | |
| Opacifier | | | 10.0 |
| Lead bisilicate | | | 10.0 |
| Whiting | 4.0 | | |
| Manganese carbonate | | | 1.0 |
| Carboxy methyl cellulose | 1.3 | 0.5 | 1.5 |
| Mucilage solution | | 11.0 | |
| Water | 54.0 | 45.0 | 57.5 |

Each of the above slurries can be mixed with a foaming solution of the character previously described, in the ratio of 1 part of slurry to 0.8–2.0 parts of foaming solution, by weight, and the mixture is ready for use in the process. It is to be understood that these final mixtures may contain as little as 0.1% of color generating agent if such agent is intense, such as pure cobalt oxide or carbonate, for example.

FIG. 1 illustrates one arrangement which may be utilized in carrying out the method for the production of a variegated, novel, decorative pattern upon ceramic tile. As there shown, pressed tile in bisque form, illustrated at 10, 11, 12, 13, 14, etc., are continuously advanced upon a suitable conveyor belt 1. The foam-applying device extends transversely across and above the path of travel of the conveyor and may comprise a trough 2 having a relatively low discharge side and discharge incline 3. Within and adjacent the bottom of the trough is a hollow, porous, ceramic, gas-diffusing cylinder 4 supplied with compressed air or other gas from a suitable source by conduit 5. (A finely perforated metal tube may be used.) The trough 2 is also supplied as by conduit 6 with the premixed suspension of color-generating material in an aqueous medium. A suitable feeding device or float-controlled feeder 7 is preferably installed in the supply line 6 so as to maintain a substantially constant liquid level within the lower portion of the trough 2.

The compressed air discharged into the body of aqueous suspension through the porous dissemination cylinder 4 maintains the suspension homogeneous, agitates it, and generates a large volume of foam (20) consisting of gas-filled bubbles, the skins or films of such bubbles carrying the finely divided or powdered color-generating material. As previously indicated, the size of the bubbles and the stability of the foam may be modified by the use of properly selected foaming agents and stabilizing agents. This foam is permitted to feed over the low edge of the trough and down the discharge incline 3 onto the substantially dry, clean, planar surfaces of the preformed ceramic tile 10–14. The speed of the conveyor 1 is correlated with the foam-generating capacity of the apparatus so that a layer of foam of desired thickness is applied to the tile. When the tile are dry and either unburned or in bisque form, the foam thus applied rapidly subsides so as to deposit the color-generating material in a pattern correlated to the average size of the bubbles and the thickness of the foam applied.

The foam 20 being a collection of gas-filled bubbles whose film-skins contain the stain or pigment, the bubbles crowd one another and tend to lose a perfectly spherical shape. In most instances the foam deposited upon the slightly absorbent surface of the tile will comprise a large number of half-bubbles or hemispherical bubbles which have attached themselves to the surface of the article, with many other bubbles between and above the lower contacting layer. The slightly absorbent ceramic body appears to soak the larger bubbles into the body; after the foam subsides the surface of the ceramic article is covered with a network of lines where the pigment or stain has been concentrated, the lines often defining circles and irregular polygonal areas. The effect is distinctive and unique. The lighter color of the ceramic body is visible within the confines of the larger areas, while in other portions of the surface to which the foam has been applied an accumulation of finer bubbles may have left a superimposition of lines which materially obscures the original body color and creates an appearance of depth.

It is to be understood that the method is not limited to the application of but a single layer of foam; a secondary contact with a froth carrying a different color-generating material may be had or such secondary application may involve the utilization of a foam or froth having a materially different average size of bubble. Interesting effects not attained heretofore may thus be produced.

After the foam has subsided as indicated hereinabove, the tile, such as 15, may be sprayed with a glaze-forming composition and fired. The glaze may be transparent or of matte or semi-matte, semi-transparent type. It is to be understood that the foam may be applied to an unburned, formed ceramic object and then fired; or to an unburned, formed ceramic object and then sprayed with glaze and subsequently fired; or it may be applied to a ceramic object in bisque form and then subjected to a second firing operation, or sprayed with glaze-forming composition before being fired; in another system the pigment-carrying foam may be applied to an object which had been formed and covered with a glaze-forming composition; the foam may also be applied to the surface of a ceramic object which had been formed, sprayed with a glaze-forming composition and fired. Those skilled in the art will observe that the method of the invention is applicable to many variations, depending upon the characteristics of the body, of the glaze-forming composition, of the foam and the effect desired.

The arrangement illustrated in FIG. 2 is rather similar to that shown in FIG. 1 and similar numbers are applied to similar portions of the apparatus. The tile 10–14 are again carried upon a conveyor 1. The trough 2 is supplied with compressed air through conduit 5. The bottom of the trough, however, is provided with a porous, diffusion plate 4' which agitates the suspension supplied to the trough by conduit 6 to form the froth or foam 20. The arrangement differs from that illustrated in FIG. 1 in the provision of a driven roller 24 adjacent the discharge incline 3 and above the surface of the tile. Such readily wettable driven roller 24 appears to have a tendency to equalize the distribution of the foam over the surfaces and tends to produce a more uniform effect.

When irregularly shaped ceramic objects, such as cups, saucers, pitchers or the like, are to be decorated by the method of this invention, an arrangement such as is illustrated in FIG. 3 may be employed. As there shown, formed ceramic objects 25 (pitchers are illustrated) are suspended from suitable hooks 26 on a traveling overhead conveyor 27. The conveyor is arranged to dip the pitchers 25 into a tank 2' supplied with the pigement-containing suspension. The bottom of the tank may be provided with a suitable number of porous diffusion plates such as 4" supplied with compressed air or other gas from valved line 5'. The formed objects 25 are thus carried through a bath of foam; an adequate quantity of foam is found to adhere to the surface of the article to produce the desired decorative effect.

It is to be remembered that a portion of the surface to be decorated may be masked as by the prior application of gummed, water-proofed strips of fabric, discs or other shapes of paper, etc., these masking devices being removed after the bubble bath but prior to firing (or prior to the application of glaze-forming composition and firing).

All changes and modifications coming within the scope of the appended claims are embraced thereby.

I claim:

1. In a method of producing a novel, distinctively variegated, decorative pattern of pigmentation to the surface of a ceramic object, the steps of: forming a suspension of finely powdered, color-generating material in a liquid medium containing a foam-producing agent said material being adapted to be carried in the films of bubbles formed from said liquid medium; converting such suspension into a foam by injecting gas thereinto; depositing such foam upon the surface of a formed ceramic article; and permitting said foam to subside and the gas-filled bubbles thereof to break while in contact with the ceramic article.

2. A method as stated in claim 1, wherein the color-generating agent is a metallic pigment.

3. In a method as stated in claim 1, the steps of applying a glaze composition of transparent and translucent type to the ceramic article after said foam has subsided on said article, and then firing the article to mature the glaze and form a protective glaze film over the applied color-generating material.

4. In a method as stated in claim 1, the step of controlling the average size of the bubbles constituting the foam by properly selecting the foaming agent and stabilizing agent and controlling their concentration in the suspension.

5. A method as stated in claim 1, wherein the ceramic article is finely porous and in the form of bisque.

6. A method as stated in claim 1, wherein the ceramic article is finely porous and in the form of bisque, and a portion of the surface thereof is masked prior to the deposit of foam thereon.

7. In a method of applying pigmentation to the surface of a ceramic object, the steps of depositing an aqueous, breakable, bubble-containing foam upon the surface of a ceramic object, the bubbles of said foam being gas-filled and containing pigment in their aqueous films, and permitting said foam to subside and the bubbles to break while in contact with the ceramic object.

8. A method as stated in claim 1 wherein said color-generating material consists essentially of material passing a 300-mesh sieve.

References Cited in the file of this patent

UNITED STATES PATENTS

| | | |
|---|---|---|
| 505,303 | Withers | Sept. 19, 1893 |
| 1,693,252 | Prouty | Nov. 27, 1928 |
| 2,160,560 | Parkinson | May 30, 1939 |
| 2,255,044 | Deyrup | Sept. 9, 1941 |
| 2,438,524 | Turbett et al. | Mar. 30, 1948 |
| 2,832,695 | Compton et al. | Apr. 29, 1958 |